US008464862B2

United States Patent
Honeycutt et al.

(10) Patent No.: US 8,464,862 B2
(45) Date of Patent: Jun. 18, 2013

(54) CONVEYOR WITH TROUGHED LOW FRICTION, POSITIVE DRIVE BELT

(75) Inventors: James Honeycutt, Grandville, MI (US); Allen Hatfield, Grand Rapids, MI (US)

(73) Assignee: THERMODRIVE, LLC, Grand Rapids, MI (US)

( * ) Notice: Subject to any disclaimer, the term of this patent is extended or adjusted under 35 U.S.C. 154(b) by 509 days.

(21) Appl. No.: 12/162,847

(22) PCT Filed: Jan. 31, 2007
(Under 37 CFR 1.47)

(86) PCT No.: PCT/US2007/061379
§ 371 (c)(1),
(2), (4) Date: Jul. 10, 2009

(87) PCT Pub. No.: WO2007/090154
PCT Pub. Date: Aug. 9, 2007

(65) Prior Publication Data
US 2010/0147656 A1    Jun. 17, 2010

Related U.S. Application Data

(63) Continuation of application No. 11/275,834, filed on Jan. 31, 2006, now abandoned.

(51) Int. Cl.
*B65G 17/10*    (2006.01)
*B65G 23/06*    (2006.01)
(52) U.S. Cl.
USPC .......................................... 198/822; 198/835

(58) Field of Classification Search
USPC ........................................ 198/822, 834, 835
See application file for complete search history.

(56) References Cited

U.S. PATENT DOCUMENTS

| 842,611 | A | * | 1/1907 | Bell | 198/835 |
|---|---|---|---|---|---|
| 2,909,271 | A | | 10/1959 | Taylor | |
| 2,998,121 | A | | 8/1961 | Gilbert | |
| 3,164,238 | A | | 1/1965 | McCullagh | |
| 3,179,238 | A | * | 4/1965 | Patin | 198/835 |

(Continued)

FOREIGN PATENT DOCUMENTS

| DE | 2854583 A1 | 6/1980 |
|---|---|---|
| EP | 0377884 A1 | 7/1990 |

(Continued)

OTHER PUBLICATIONS

State Intellectual Property Office of the People's Republic of China, Notification of the First Office Action for Application No. 200780008733.8, date of notification Feb. 1, 2011.

(Continued)

*Primary Examiner* — Mark A Deuble
(74) *Attorney, Agent, or Firm* — McGarry Bair PC (57) ABSTRACT

A conveyor comprises an endless thermoplastic belt having a substantially flat surface on one side of the belt and a plurality of teeth on the other side of the belt. The teeth are adapted to be driven without tension around a drive sprocket and an idler. The conveyor further includes means to cause the belt to form a longitudinal trough between the drive sprocket and the idler to retain conveyed items on the belt. The means can comprise a discontinuity in the teeth, shortened teeth, and/or guides that apply a force to the edges of the belt.

15 Claims, 10 Drawing Sheets

U.S. PATENT DOCUMENTS

| | | | |
|---|---|---|---|
| 3,578,149 A | | 5/1971 | Thomson |
| 3,853,016 A | * | 12/1974 | Lane et al. .................... 198/698 |
| 4,024,949 A | * | 5/1977 | Kleysteuber et al. ......... 198/831 |
| 4,072,062 A | | 2/1978 | Morling et al. |
| 4,290,761 A | * | 9/1981 | Suginaka ..................... 474/190 |
| 4,337,672 A | * | 7/1982 | Shiber ............................ 74/438 |
| 4,589,543 A | * | 5/1986 | Hastem-Muller ............. 198/834 |
| 4,703,846 A | | 11/1987 | Salminen et al. |
| 4,898,272 A | | 2/1990 | Swinderman et al. |
| 5,271,492 A | * | 12/1993 | Lewin et al. .................. 198/830 |
| 5,320,214 A | | 6/1994 | Kordis |
| 5,470,293 A | * | 11/1995 | Schonenberger ............... 482/54 |
| 5,662,541 A | * | 9/1997 | Roovers ........................ 474/149 |
| 5,784,996 A | * | 7/1998 | Krehl ......................... 119/57.92 |
| 5,911,307 A | | 6/1999 | Kraft et al. |
| 6,109,427 A | * | 8/2000 | Hosch et al. .................. 198/835 |
| 6,136,191 A | * | 10/2000 | Gribble et al. ................ 210/400 |
| 6,564,932 B2 | * | 5/2003 | Itoh ............................... 198/835 |
| 6,811,023 B1 | * | 11/2004 | Christiana et al. ............ 198/822 |
| 6,938,754 B2 | * | 9/2005 | Kanaris ......................... 198/494 |
| 7,021,457 B1 | * | 4/2006 | Schiltz .......................... 198/835 |
| 7,124,879 B1 | * | 10/2006 | Maguire ..................... 198/690.2 |
| 7,850,562 B2 | * | 12/2010 | DeGroot ....................... 474/153 |
| 2002/0175055 A1 | | 11/2002 | Ryde |
| 2003/0155211 A1 | | 8/2003 | Mott |
| 2004/0026218 A1 | | 2/2004 | Kotaki et al. |
| 2004/0089519 A1 | * | 5/2004 | Pollak et al. .................. 198/834 |
| 2005/0082147 A1 | * | 4/2005 | Mol ............................... 198/834 |
| 2005/0109588 A1 | | 5/2005 | Gariglio |
| 2006/0021858 A1 | * | 2/2006 | Sherwood ..................... 198/813 |

FOREIGN PATENT DOCUMENTS

| | | |
|---|---|---|
| EP | 0499455 A2 | 8/1992 |
| FR | 650935 A | 2/1929 |
| FR | 2693441 A1 | 1/1994 |
| JP | 42008257 Y1 | 4/1967 |
| JP | S54-67980 A | 5/1979 |
| JP | 54066283 | 12/1980 |
| JP | 57102407 A | 6/1982 |
| JP | 61-287608 A | 12/1986 |
| JP | 64-87416 A | 3/1987 |
| JP | 64-87416 A | 3/1989 |
| JP | 1-117111 A | 5/1989 |
| JP | 3-56712 U | 5/1991 |
| JP | H0738021 U | 7/1995 |
| JP | 9077223 A | 3/1997 |

OTHER PUBLICATIONS

State Intellectual Property Office of the People's Republic of China, Notification of the Second Office Action for Application No. 200780008733.8, date of notification Mar. 23, 2012.

Mexican Institute of Industrial Property, second Office Action for Application No. MX/a/2008/009795, date of notification Mar. 26, 2012.

Japanese Office Action (English and Japanese), dated Apr. 20, 2012, 15 pages.

* cited by examiner

CONVEYOR WITH TROUGHED LOW FRICTION, POSITIVE DRIVE BELT

CROSS-REFERENCE TO RELATED APPLICATION

This application is a national phase of International Application No. PCT/US2007/061379, filed Jan. 31, 2007, and claims priority from U.S. application Ser. No. 11/275,834 filed Jan. 31, 2006.

BACKGROUND OF THE INVENTION

1. Field of the Invention

The invention relates to conveyors with endless belts and, more particularly, to conveyors with low friction, positive drive belts capable of forming a trough to retain conveyed items on the belt.

2. Description of the Related Art

Conveyors with friction-driven flat belts are known systems for moving items from one location to another. A tensioned, endless belt extends between a drive pulley and a tail piece (typically a pulley or a fixed bar), whereby friction between the drive pulley and the belt enables transfer of torque from the former to the latter to thereby induce movement of the belt. Because tension on the belt is required to maintain the requisite friction for moving the belt, this type of conveyor does not perform well in environments where the tension and friction can be compromised. For example, in the food industry, introduction of grease and effluents from food products can result in a loss of friction and thereby detrimentally affect the performance of the conveyor.

Another type of conveyor comprises a direct or positive drive modular belt. In this type of conveyor, a modular belt formed of a plurality of interlocking links extends between a drive pulley and an idler pulley and comprises a plurality of teeth that engage corresponding sheaves on the drive pulley. Interaction between the teeth and sheaves transfers torque to the belt. As a result, the conveyor does not rely on friction for moving the belt, and the liquids associated with food handling do not affect performance in the manner described above for friction-driven belts. However, other problems arise when using low tension, direct drive modular belts in the food industry, most notably related to hygiene and cleanliness. For example, fluids and debris can become lodged in the joints of the interconnecting links, and are difficult to sanitarily remove.

Figure 1:
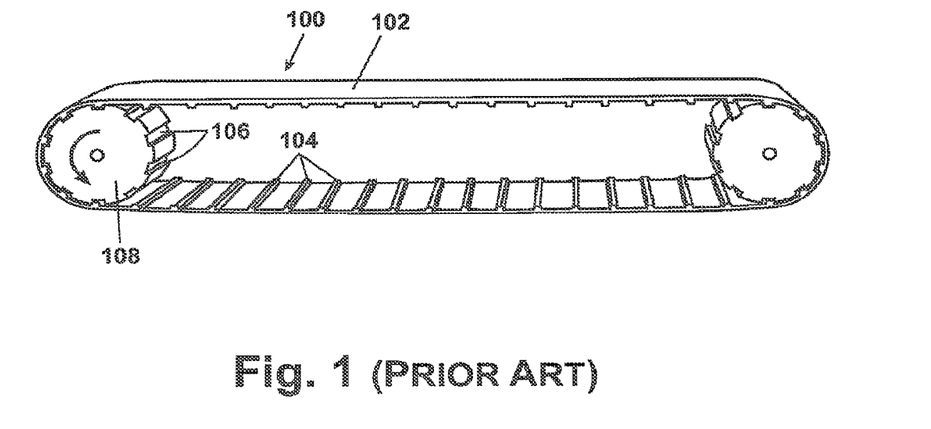
FIG. 1 is a perspective view of a prior art conveyor comprising a low tension, positive drive belt installed between two sprockets.

Conveyors with a low friction, positive drive belt 100 having a flat surface 102 on one side and teeth 104 on the other side, as illustrated in FIG. 1, overcome the problems associated with the friction-driven flat belts and the modular belts. The seamless flat surface 102 is easy to clean, while the teeth 104 engage sheaves 106 on a drive sprocket 108 to transfer torque to the belt 100 without requiring friction between the belt 100 and the drive sprocket 108 or tension in the belt 100. Such a conveyor is disclosed in U.S. Pat. No. 7,850,562 to DeGroot, which is incorporated herein by reference in its entirety.

In the food handling industry, one problem associated with conveyors is retaining the conveyed item on the belt. Some items tend to migrate to the edges of the belt and, if not restrained, can fall off the belt. For conveyors with modular belts, one solution has been to provide side rails, but the items can become caught between the belt and the side rails. Alternatively, friction-driven belts can automatically form a trough when under sufficient tension, and the items naturally reside in the trough. Troughs are effective for alleviating the migration problem, but they do not automatically form in low friction, untensioned, positive drive belts.

SUMMARY OF THE INVENTION

A conveyer comprising a toothed belt having a substantially flat surface on one side of the belt and a plurality of teeth on the other side of the belt extending mostly from one edge to the other edge of the belt, wherein the teeth are adapted to be driven by a sprocket, is characterized by a means to form a longitudinal trough in the Belt. In one embodiment, the teeth have at least one discontinuity positioned at the same distance between the edges of the belt, so that the belt can form a longitudinal trough aligned with the discontinuities.

According to another embodiment, the discontinuity is formed by at least one slit in the tooth. The tooth can comprise only one slit. More than one slit can be provided to form a compound trough having a flat bottom. The slit can extend through the whole tooth, or less than or more than the whole tooth.

According to another embodiment, the discontinuity is formed by at least one gap in the tooth. The tooth can comprise only one gap. More than one gap can be provided to form a compound trough having a flat bottom. The gap can extend through the whole tooth, or less than or more than the whole tooth.

According to another embodiment, the conveyer further comprises edge guides that hold the trough shape.

According to another embodiment, the belt further comprises cleats on the flat surface.

According to another embodiment, the belt comprises edges that join the sides of the belt, and the means comprises gaps between the tooth and each of the edges of the belt. The gaps can be equal in distance from the edge to the tooth to centrally locate the tooth and the trough between the edges.

According to another embodiment, the belt comprises edges that join the sides of the belt, and the means comprises edge guides that contact the belt to urge the edges to displace relative to the center of the belt to form the trough.

According to one embodiment, the guides comprise a pair of bars that are mounted beneath the edges between the drive sprocket and idler and exert an upward force on the edges.

According to another embodiment, the guides comprise rollers that are mounted beneath the edges between the drive sprocket and idler and exert an upward force on the edges.

According to another embodiment, the guides comprise shoes arranged in pairs between the drive sprocket and idler to receive the edges of the belt, wherein the pairs of shoes exert an inward force on the edges.

DETAILED DESCRIPTION

The invention alleviates the problems of the prior art by providing a conveyor with a low friction, positive drive belt and means, which can comprise part of the belt or some other part of the conveyor, for causing the belt to form a trough to retain conveyed items on the belt. The trough forms without requiring tension in the belt and provides a channel that tends to hold the conveyed items and tends to prevent the items from migrating to edges of the belt. Descriptions of several exemplary embodiments of the conveyor with a troughed, low friction, positive drive belt follow.

Figure 2:
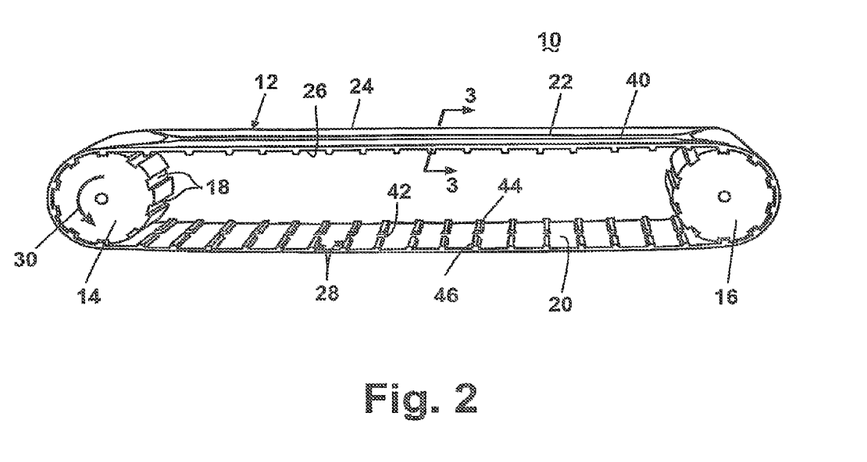
FIG. 2 is a perspective view of a conveyor according to a first embodiment of the invention comprising a low tension, positive drive belt having a gap in each tooth to form a trough in the belt.
Figure 3:
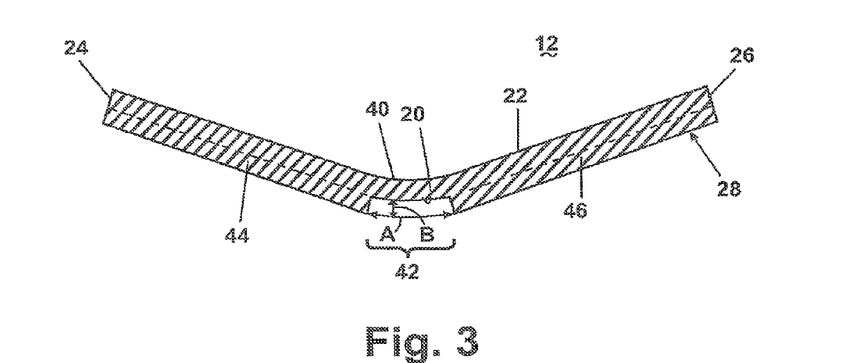
FIG. 3 is a sectional view taken along line 3-3 of FIG. 2.

Referring now to the figures, FIGS. 2 and 3 illustrate a first embodiment of a conveyor 10 comprising an endless belt 12 according to the invention. FIG. 2 shows the belt 12 in a typical installation between two sprockets 14, 16. At least one sprocket, e.g. sprocket 14, is a drive sprocket; the other sprocket 16 is preferably an idler or a slave sprocket, or even a fixed bar. The drive sprocket 14 is conventional and can be any of a number of different forms and sizes. The drive sprocket 14 has a number of transverse grooves or sheaves 18 spaced around its circumference. The belt 12, which is typically made of a thermoplastic material such as Pebax® resin, polyester, or polyurethane, comprises an inside surface 20 and an outside surface 22 joined at side edges 24, 26. The outside surface 22 is fairly smooth and free of discontinuities.

The belt 12 further comprises a plurality of teeth 28 spaced from each other on the inside surface 20 of the belt 12. The teeth 28 engage the sheaves 18 of each sprocket 14, 16 as the belt 12 wraps around the sprocket 14, 16. In this configuration, the upper span of the belt 12 will carry loads as the belt 12 travels in the direction of arrow 30.

The sprockets 14, 16 and the belt 12 are designed to permit minimal friction between them. The toothed inside surface 20 of the belt 12 can be coated with a friction reducing material, e.g. polytetrafluoroethylene (PTFE), also known as Teflon®. The sprockets 14, 16 preferably have minimal surfaces contacting the belt 12 anywhere but at the teeth 28. For example, the supporting structure between adjacent sheaves 18 can be recessed from the perimeter of the sprocket 14, 16. It can also have a narrower neck to reduce surface contact with the belt 12. Further description of an exemplary low friction, positive drive belt is provided in the aforementioned and incorporated U.S. Patent Application No. 60/593,493.

According to the invention, the belt 12 further comprises means that enable the belt 12 to form a longitudinal trough 40 to facilitate retaining conveyed items on the outer surface 22 of the belt 12. The embodiment of FIGS. 2 and 3 shows the means as a gap 42 formed in the teeth 28. As best viewed in FIG. 3, the gap 42 divides each of the teeth 28 into a first tooth portion 44 spaced from a second tooth portion 46 a distance A equal to the width of the gap 42. Thus, the first tooth portion 44 extends from the side edge 24 to the gap 42, and the second tooth portion 46 extends from the other side edge 26 to the gap 42. In FIG. 3 and in other similar figures (i.e., FIGS. 5, 7, 9, 11, and 13) a dotted line indicates an approximate juncture between the base of a tooth 28 and the inside surface 20 of the belt 12. This dotted line is provided for explanatory purposes only and does not necessarily represent a structural feature. According to the illustrated embodiment, the gap 42 is formed in each of the teeth 28 at the same distance between the edges 24, 26 of the belt 12; thus, the gaps 42 in the teeth 28 are longitudinally aligned. As a result of the gaps 42 and the longitudinal alignment thereof, the belt 12 can naturally bend at the gaps 42. Such bending will likely occur at the upper span when a force urges the middle of the belt to deflect, such as a transported object on the belt or even the weight of the belt itself. As well, the side edges 24, 26 can deflect relative to the rest of the belt 12 to form the trough 40.

Figure 3A:
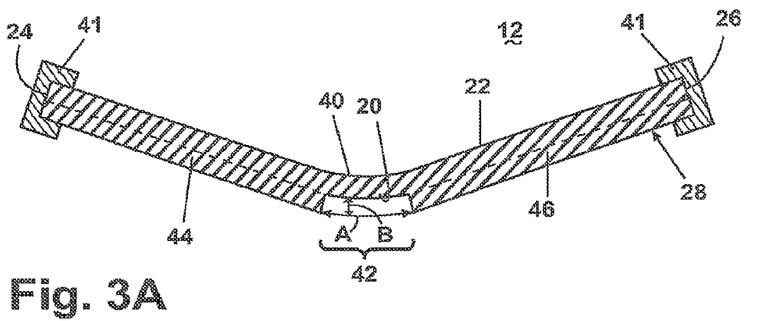
FIG. 3a is the sectional view of FIG. 3 with the addition of edge guides.

Geometrical characteristics of the gap 42, such as the distance A between the first and second tooth portions 44, 46 and an extent B representing the depth to which the gap 42 extends through each of the teeth 28, determine, at least in part, the depth of the trough 40. In FIG. 3, the gap 42 is shown as extending through the whole tooth 28, although it is within the scope of the invention for the gap 42 to extend only part way through the tooth. Edge guides 41 can be provided at the edges 24, 26 to hold the trough 40 in a preferred configuration as shown in FIG. 3a. Here, the edge guides 41 preferably do not impart a lateral force to the belt.

Figure 3B:
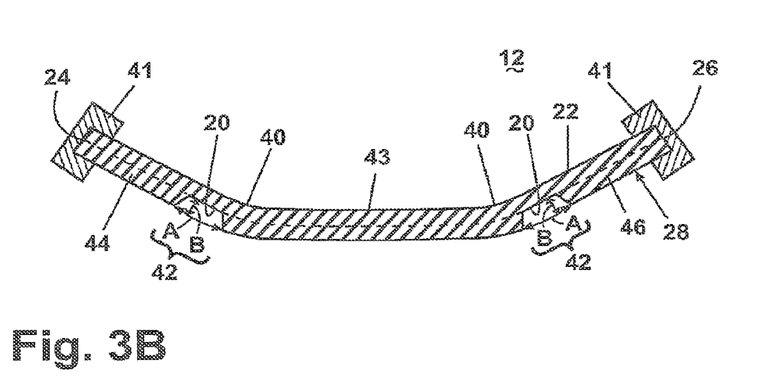
FIG. 3b is a sectional view similar to the embodiment of FIG. 3, but with a modification showing two gaps.
Figure 3C:
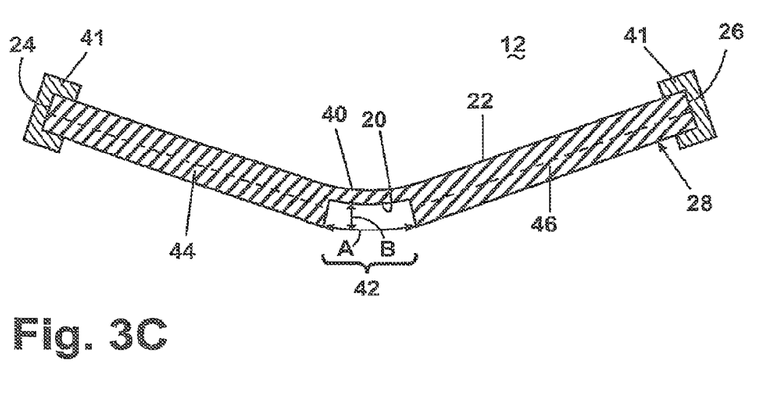
FIG. 3c is a sectional view similar to the embodiment of FIG. 3, but with a modification showing a deeper gap.

Additionally, the number of the gaps 42 in each of the teeth 28 affects the shape of the trough 40, and, although only one gap 42 is shown in each of the teeth 28 in the illustrated embodiment, it is within the scope of the invention for each of the teeth 28 to include multiple gaps 42 and thereby more than two tooth portions in order to achieve a desired trough shape. See, for example, FIG. 3b showing two gaps 42, spaced from each other, to form a trough with a flat bottom 43. Furthermore, in the illustrated embodiment, the gaps 42 are centrally located in each of the teeth 28 to position a lowermost point of the trough 40 approximately halfway between the side edges 24, 26, but it is within the scope of the invention to locate the gaps 42 other than centrally between the side edges 24, 26 to offset the trough. Moreover, it is within the scope of the invention for the extent B to extend past the tooth into the base of the belt itself. See, for example, the embodiment in FIG. 3c.

Figure 4:
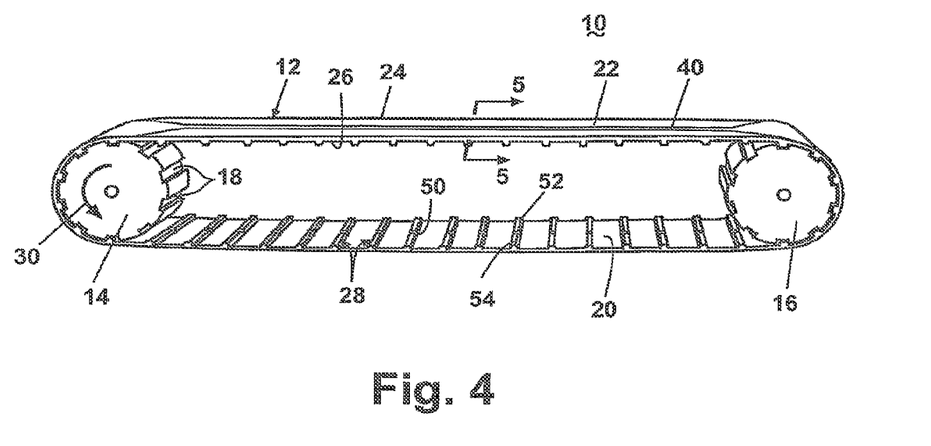
FIG. 4 is a perspective view of a conveyor according to a second embodiment of the invention comprising a low tension, positive drive belt having a slit in each tooth to form a trough in the belt.
Figure 5:
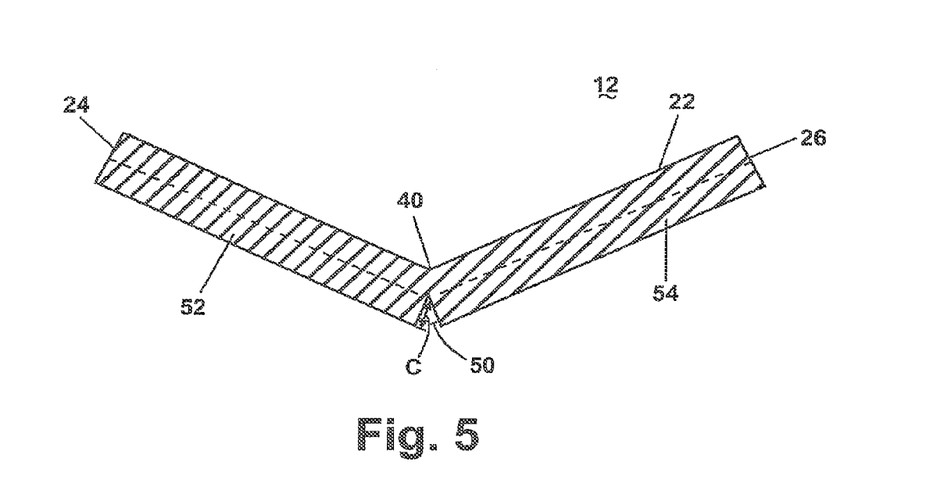
FIG. 5 is a sectional view taken along line 5-5 of FIG. 4.

A second embodiment of the conveyor 10 according to the invention is illustrated in FIGS. 4 and 5, where components and features similar to those of the previous embodiment are identified with the same reference numeral. The second embodiment conveyor 10 is substantially identical to the previous embodiment, except that a structure enabling forming a trough 40 comprises a slit 50 formed in the teeth 28. The slit 50 differs from the gap 42 in that the slit 50 does not form an appreciable space between portions of the tooth 28. Rather, the slit 50 can be viewed as a cleft in the tooth 28 that separates the tooth 28 into portions without removing material from the tooth 28.

Figure 5A:
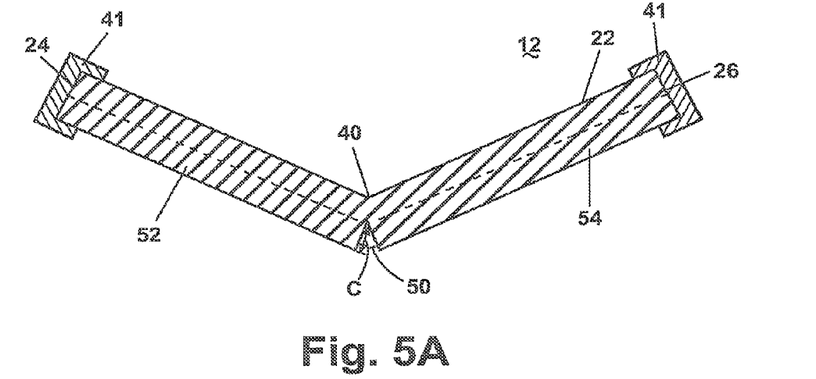
FIG. 5a is the sectional view of FIG. 5 with the addition of edge guides.

As best viewed in FIG. 5, the slit 50 divides each of the teeth 28 into a first tooth portion 52 and a second tooth portion 54. Thus, the first tooth portion 52 extends from the side edge 24 to the slit 50, and the second tooth portion 54 extends from the other side edge 26 to the slit 50. According to the illustrated embodiment and similar to the first embodiment, the slit 50 is formed in each of the teeth 28 at the same distance between the edges 24, 26 of the belt 12; thus, the slits 50 in the teeth 28 are longitudinally aligned. As a result of the slits 50 and the longitudinal alignment thereof, the belt 12 can naturally bend at the slits 50, whereby the side edges 24, 26 deflect relative to the rest of the belt 12 to form the trough 40. An extent C to which the slit 50 extends through each of the teeth 28 determines, at least in part, the depth of the trough 40. In FIG. 5, the slit 50 is shown as extending through the whole tooth 28, although it is within the scope of the invention for the slit 50 to extend only part way through the tooth. Edge guides 41 can be provided at the edges 24, 26 to hold the trough 40 in a preferred configuration as shown in FIG. 5a. Here, the edge guides 41 preferably do not impart a lateral force to the belt.

Figure 5B:
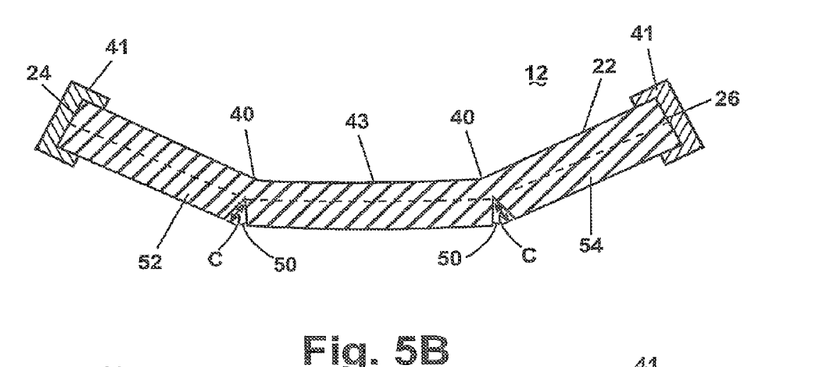
FIG. 5b is a sectional view similar to the embodiment of FIG. 5, but with a modification showing two slits.
Figure 5C:
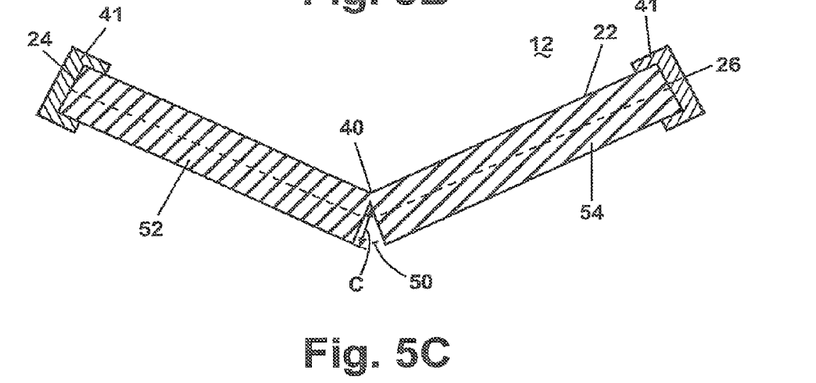
FIG. 5c is a sectional view similar to the embodiment of FIG. 5, but with a modification showing a deeper slit.

Additionally, the number of the slits 50 in each of the teeth 28 affects the shape of the trough 40, and, although only one of the slits 50 is shown in each of the teeth 28 in the illustrated embodiment, it is within the scope of the invention for each of the teeth 28 to include multiple slits 50 in order to achieve a desired trough shape. See, for example, FIG. 5b showing two slits 50, spaced from each other, to form a trough with a flat bottom 43. Furthermore, in the illustrated embodiment, the slits 50 are centrally located in each of the teeth 28 to position a lowermost point of the trough 40 approximately halfway between the side edges 24, 26, but it is within the scope of the invention to locate the slits 50 other than centrally between the side edges 24, 26 to offset the trough. Moreover, it is within the scope of the invention for the extent C to extend past the tooth into the base of the belt itself. See, for example, the embodiment in FIG. 5c.

Figure 6:
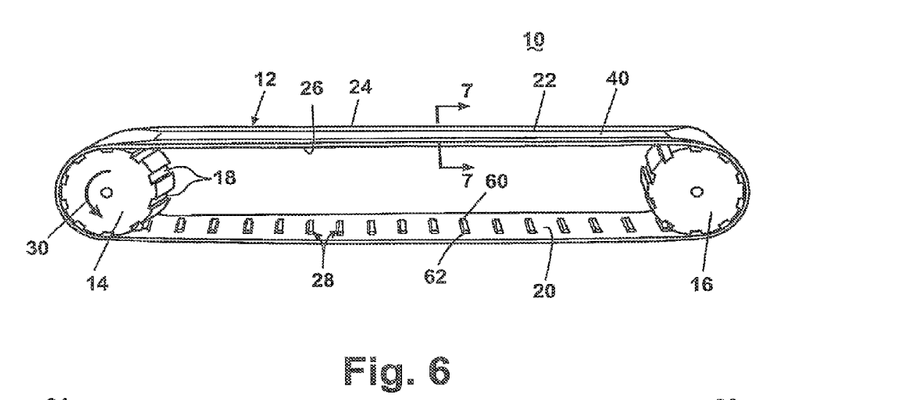
FIG. 6 is a perspective view of a conveyor according to a third embodiment of the invention comprising a low tension, positive drive belt having gaps between the ends of the teeth and the edges of the belt to form a trough in the belt.
Figure 7:
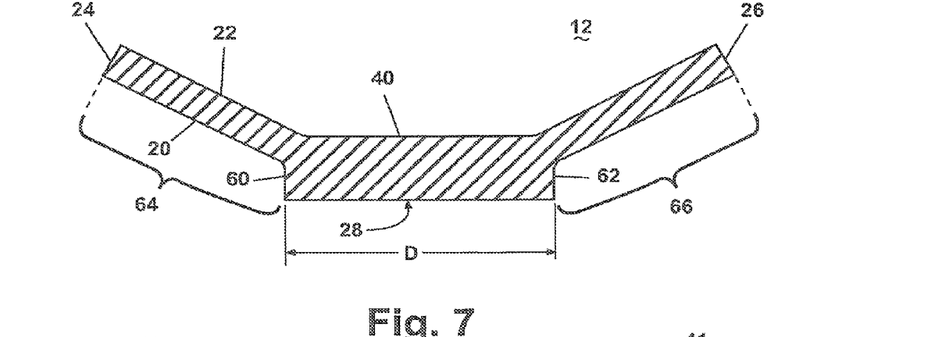
FIG. 7 is a sectional view taken along line 7-7 of FIG. 6.
Figure 7A:
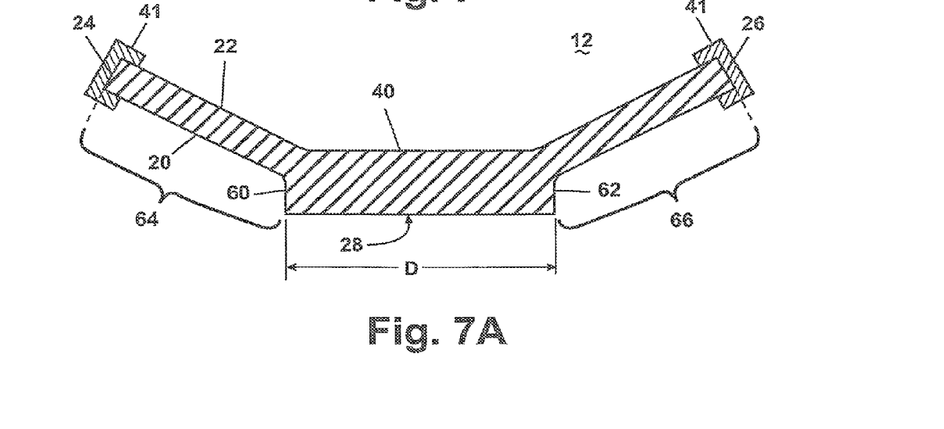
FIG. 7a is the sectional view of FIG. 7 with the addition of edge guides.

The means or structure for forming the trough 40 in the first and second embodiments of the conveyor 10 comprise a discontinuity in the foam of the gap 42 or the slit 50 in each of the teeth 28. FIGS. 6 and 7 illustrate a third embodiment of the conveyor 10 according to the invention, where the teeth 28 are shortened to enable formation of a trough. In the figures, the components and features similar to those of the previous embodiments are identified with the same reference numeral.

As best viewed in FIG. 7, the teeth 28 of the belt 12 are shortened in that the teeth 28 do not extend between the side edges 24, 26 of the belt 12. Rather, each of the teeth 28 extends between first and second tooth side edges 60, 62 that are spaced from the side edges 24, 26 of the belt 12. The first tooth side edge 60 is spaced from the side edge 24 of the belt 12 to form a first gap 64, and the second tooth side edge 62 is spaced from the other side edge 26 of the belt 12 to form a second gap 66. According to the illustrated embodiment, each of the teeth 28 are located at the same distance between the edges 24, 26 of the belt 12; therefore, the teeth 28 are longitudinally aligned, the first gaps 64 are longitudinally aligned, and the second gaps 66 are longitudinally aligned. As a result of this configuration, the side edges 24, 26 of the belt 12 naturally deflect relative to the rest of the belt 12 to form the trough 40.

Geometrical characteristics of the tooth 28, such as a width D of the tooth 28, which defines the size of the gaps 64, 66, determine, at least in part, the depth of the trough 40. Additionally, in the illustrated embodiment, the teeth 28 are centrally located along the belt 12 to position a lowermost point of the trough 40 approximately halfway between the side edges 24, 26. When the teeth 28 are approximately centrally located, the first and second gaps 64, 66 are substantially equal in size. However, it is within the scope of the invention to locate the teeth 28 other than centrally between the side edges 24, 26.

Figure 8:
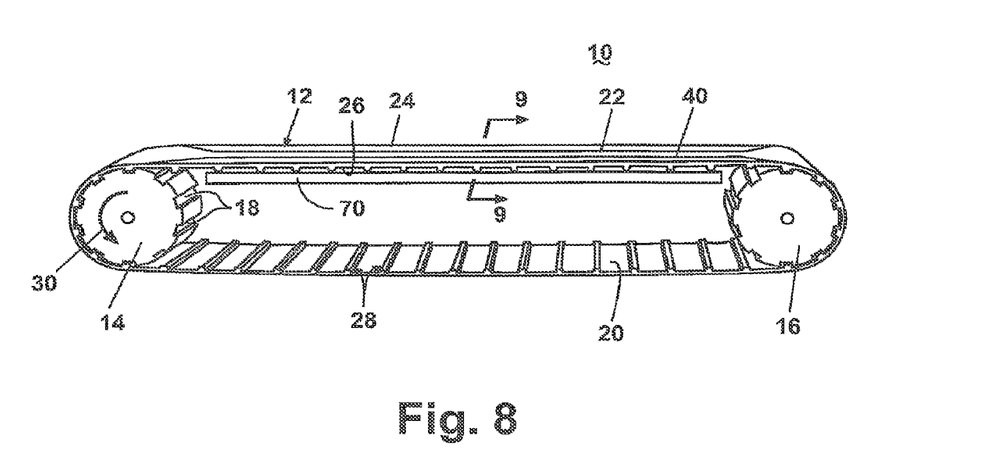
FIG. 8 is a perspective view of a conveyor according to a fourth embodiment of the invention comprising a low tension, positive drive belt and guides in the form of bars that exert an upward force on the edges of the belt to form a trough in the belt.
Figure 9:
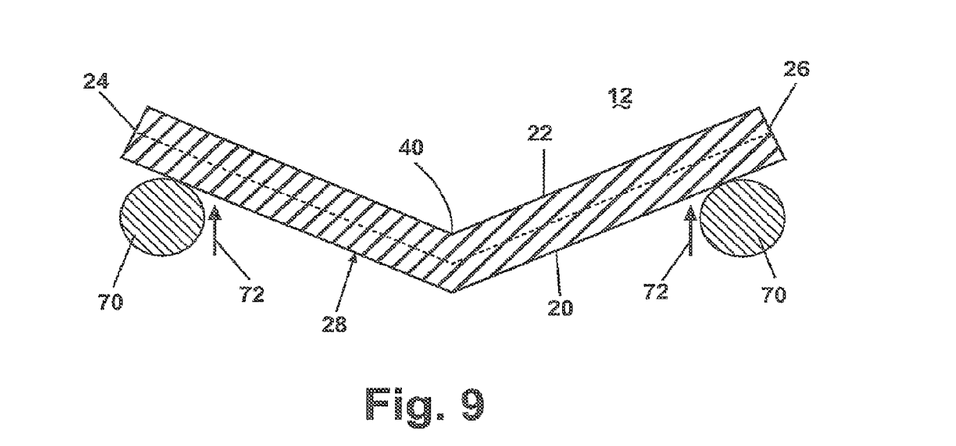
FIG. 9 is sectional view taken along line 9-9 of FIG. 8.

A fourth embodiment of the conveyor 10 according to the invention is illustrated in FIGS. 8 and 9, where components and features similar to those of the previous embodiments are identified with the same reference numeral. In the fourth embodiment conveyor 10, the teeth 28 are full-sized teeth that extend between the side edges 24, 26 of the belt 12 without any discontinuities, and the means for forming the trough 40 comprises a guide in the form of a pair of bars 70. The teeth 28 are flexible enough, either by the material from which they are formed or by their structure, to enable some bending about a longitudinal axis of the belt 12.

The bars 70, which are separate from the belt 12 but part of the conveyor 10, extend along an upper span of the belt 12 between the sprockets 14, 16 and are located beneath the side edges 24, 26. To form the trough 40, the bars 70 are positioned to apply an upward force, as indicated by arrows 72, to the side edges 24, 26 and thereby displace the side edges 24, 26 relative to the center of the belt 12 (i.e., the portion of the belt 12 about midway between the side edges 24, 26). The size and positioning of the bars 70 is selected to achieve a desired depth of the trough 40. Additionally, each of the bars 70 can be formed by a plurality of spaced, shorter bars that together have a length approximately equal to that of a single bar 70.

Figure 10:
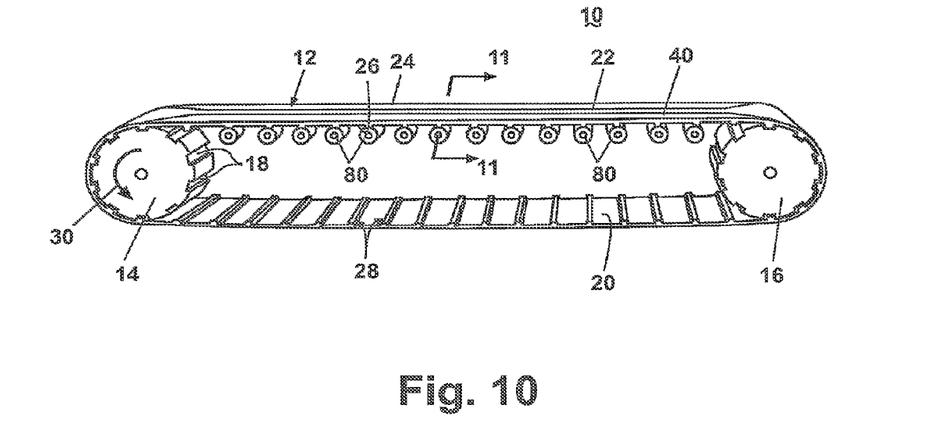
FIG. 10 is a perspective view of a conveyor according to a fifth embodiment of the invention comprising a low tension, positive drive belt and guides in the form of rollers that exert an upward force on the edges of the belt to form a trough in the belt.
Figure 11:
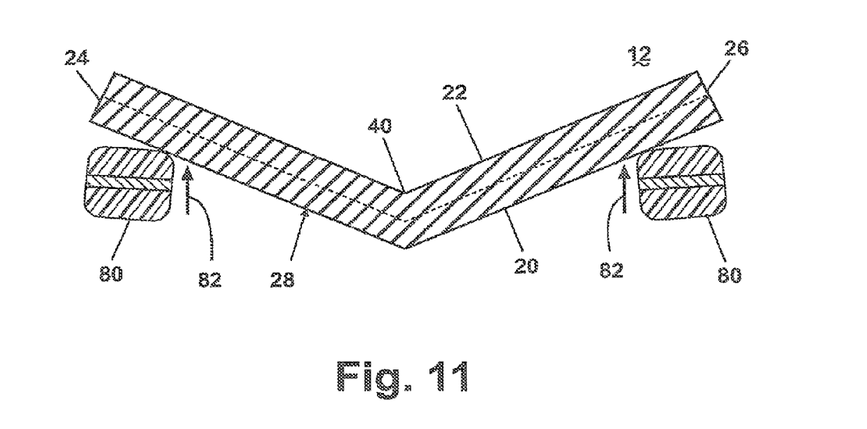
FIG. 11 is a sectional view taken along line 11-11 of FIG. 10.

FIGS. 10 and 11 illustrate a fifth embodiment of the conveyor 10 according to the invention, which is similar to the fourth embodiment, except that the guide is in the form of a plurality of rollers 80 rather than the bars 70. In the figures, the components and features similar to those of the previous embodiment are identified with the same reference numeral. With respect to forming the trough 40, the rollers 80 function the same as the bars 70; the rollers 80 apply an upward force, as indicated by an arrow 82, to the side edges 24, 26 of the belt 12 and thereby displace the side edges 24, 26 relative to the center of the belt 12. The rollers 80 provide the additional advantage of rotating as the belt 12 advances and, thus, providing little resistance to movement of the belt 12.

Figure 12:
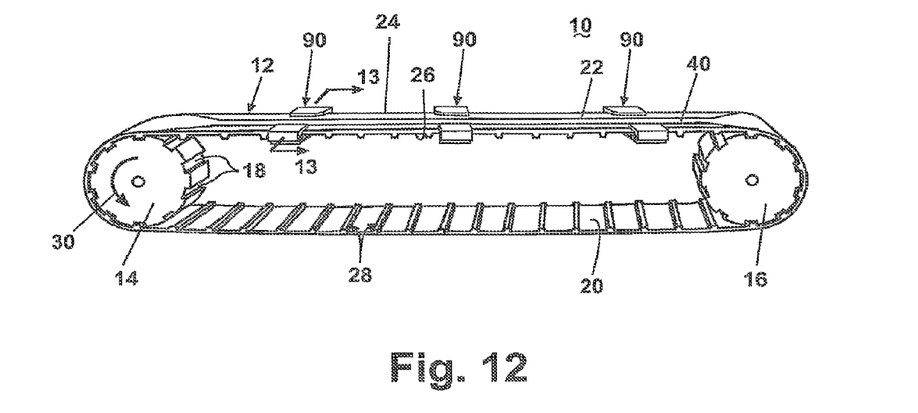
FIG. 12 is a perspective view of a conveyor according to a sixth embodiment of the invention comprising a low tension, positive drive belt and guides in the form of shoes that exert an inward force on the edges of the belt to form a trough in the belt.
Figure 13:
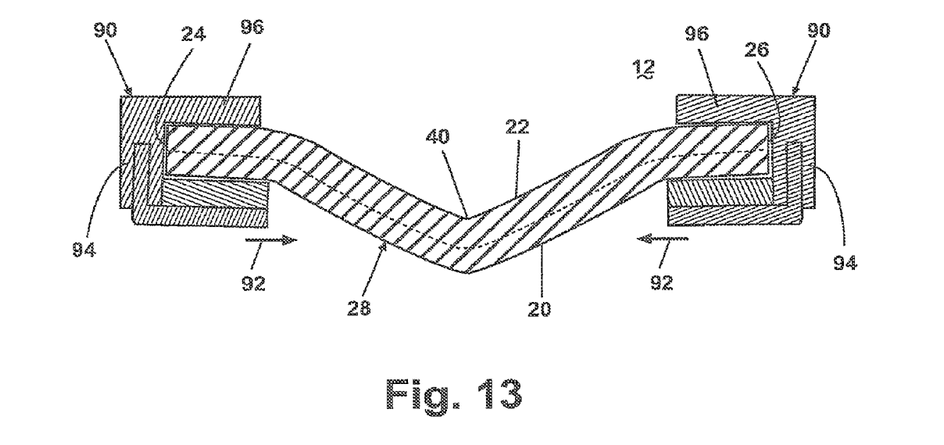
FIG. 13 is a sectional view taken along line 13-13 of FIG. 12.

A sixth embodiment of the conveyor 10 according to the invention is illustrated in FIGS. 12 and 13, where components and features similar to those of the previous embodiments are identified with the same reference numerals. The sixth embodiment conveyor 10 is substantially identical to the previous embodiments that comprise a guide, except that the guide is in the form of shoes 90.

The shoes 90, which are separate from the belt 12 but part of the conveyor 10, are arranged in pairs along the upper span of the belt 12 between the sprockets 14, 16 and apply an inward force, as indicated by an arrow 92, to the side edges 24, 26. The inward force causes the side edges 24, 26 to deflect relative to the center of the belt 12 to form the trough 40. Each shoe 90 comprises a body 94 sized to receive one of the side edges 24, 26 of the belt 90. The body 94 includes a stop 96 to limit upward movement of the side edge 24, 26 received by the body 94.

The guides in the embodiments of FIGS. 8-13 all apply a force to the belt 12 to cause the belt 12 to form the trough 40. Each of these embodiments are shown as comprising the belt 12 having the teeth 28 that extend between the side edges 24, 26 without any discontinuities; however, it is within the scope of the invention to utilize the guides with belts that include other means for forming the trough 40. For example, any type of guide can be used with any of the belts 12 in the embodiments of FIGS. 2-7 or belts that comprise other structures or features for forming the trough 40. When the conveyor 10 includes the guide and modified belt teeth, the two means cooperate to together form the trough 40.

Figure 14:
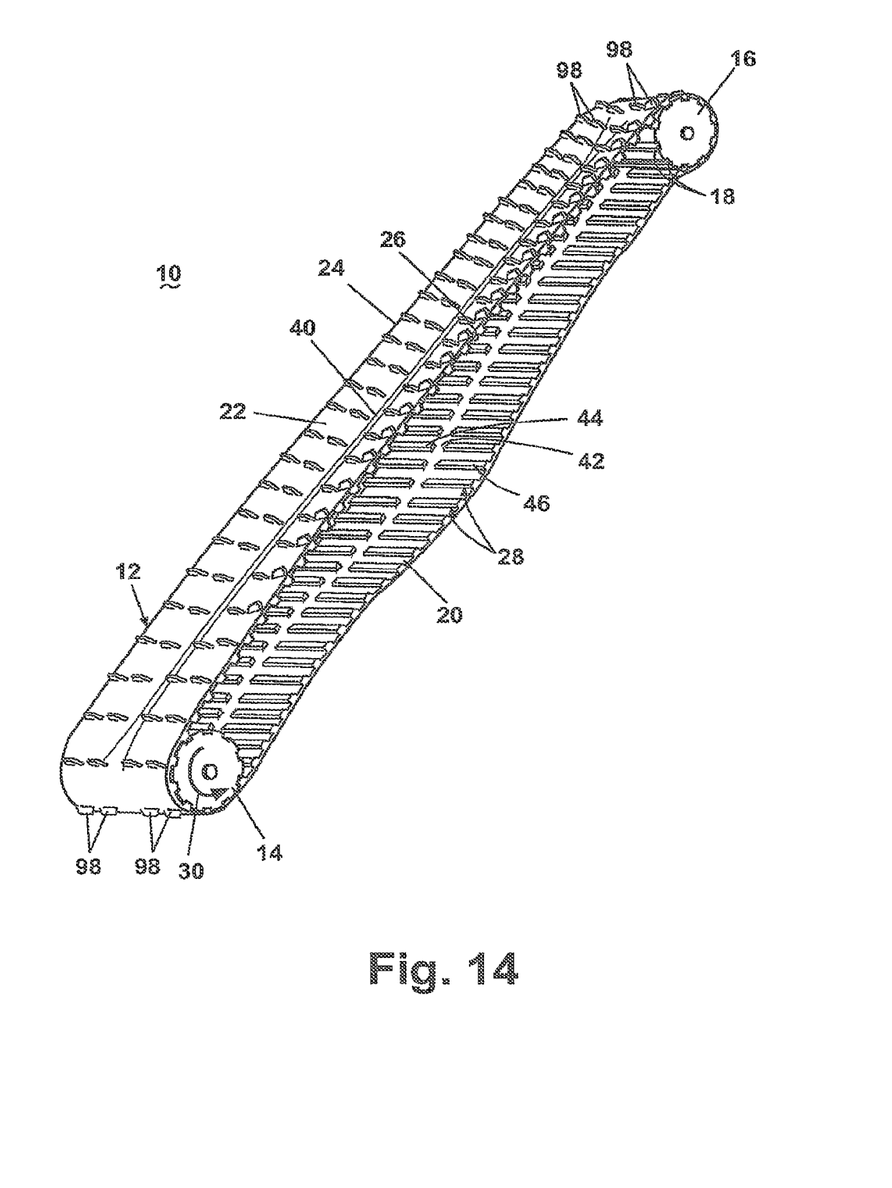
FIG. 14 is a perspective view of the conveyor from FIG. 2 with the addition of cleats on the belt.

The belts 12 described above and shown in the figures can further comprise additional features commonly associated with low friction, positive drive belts. Such features can include, but are not limited to, cleats, printing on the outer surface 22 to facilitate sorting and counting, perforations, and a profiled outer surface 22 for special product handling. An example of an embodiment of conveyor 10 comprising the gap 42 shown in FIGS. 2 and 3 and cleats 98 is illustrated in FIG. 14, where components and features similar to those of the previous embodiments are identified with the same reference numeral.

While the invention has been specifically described in connection with certain specific embodiments thereof, it is to be understood that this is by way of illustration and not of limitation, and the scope of the appended claims should be construed as broadly as the prior art will permit.

What is claimed is:

1. In a conveyor comprising a thermoplastic toothed belt having a substantially smooth outside surface free of discontinuities and a plurality of teeth spaced from each other on an inside surface of the belt, wherein the belt is driven by engagement of the teeth with a drive sprocket, with no more than incidental tension and with low friction around the drive sprocket and an idler with an unsupported span extending between the drive sprocket and the idler, the improvement comprising
at least one slit or gap in each tooth located equidistant from side edges of the belt to enable the formation of a longitudinal trough in the belt centrally located between the side edges at the unsupported span between the drive sprocket and the idler wherein the longitudinal trough forms in the unsupported span by a force acting on the belt with no more than incidental tension in the belt and provides a channel that tends to hold conveyed items and prevent them from migrating to edges of the belt.

2. The improvement according to claim 1, further comprising edge guides that contact the belt to urge the edges to displace relative to the center of the belt to form the trough.

3. The improvement according to claim 1, wherein each tooth comprises only one slit.

4. The improvement according to claim 1, wherein each tooth comprises only one gap.

5. The improvement according to claim 1, wherein the conveyer further comprises edge guides that contact the belt to urge the side edges to displace relative to the at least one slit or gap.

6. A conveyor comprising:
a thermoplastic toothed belt having a substantially smooth outside surface free of discontinuities and a plurality of teeth spaced from each other on an inside surface of the belt, driven with no more than incidental tension and with low friction around a drive sprocket and an idler with an unsupported span extending between the drive sprocket and the idler;
at least one slit or gap in each tooth located equidistant from side edges of the belt to enable the formation of a longitudinal trough in the belt centrally located between the side edges at an unsupported span between the drive sprocket and the idler; and
guides disposed at the edges of the belt to urge the edges to displace relative to the center of the belt to form the longitudinal trough, wherein the longitudinal trough forms in the unsupported span with no more than incidental tension in the belt and provides a channel that tends to hold conveyed items and prevent them from migrating to edges of the belt.

7. The conveyer according to claim 6, wherein the guides comprise a pair of bars that are mounted beneath the edges and exert an upward force on the edges.

8. The conveyer according to claim 6, wherein the guides comprise rollers that are mounted beneath the edges and exert an upward force on the edges.

9. The conveyer according to claim 6, wherein the guides comprise shoes arranged in pairs to receive the edges of the belt, wherein the pairs of shoes exert an inward force on the edges.

10. The conveyor according to claim 6 wherein each tooth comprises only one slit.

11. The conveyor according to claim 6 wherein each tooth comprises only one gap.

12. In a conveyer comprising a thermoplastic toothed belt having a substantially smooth outside surface free of discontinuities and a plurality of teeth spaced from each other on an inside surface of the belt extending mostly from one edge to the other edge of the belt, wherein the belt is driven by engagement of the teeth with a drive sprocket with no more than incidental tension and with low friction, the improvement wherein each tooth has at least one slit or gap in each tooth located equidistant from side edges of the belt, whereby a force acting on the belt will cause the belt to form a longitudinal trough centrally located between the side edges.

13. The conveyor according to claim 12 wherein each tooth comprises only one slit.

14. The conveyor according to claim 12 wherein each tooth comprises only one gap.

15. The conveyor according to claim 12 further comprising edge guides that contact the belt to urge the side edges to displace relative to the center of the belt to form the trough.

* * * * *